United States Patent [19]

Maier et al.

[11] Patent Number: 5,400,972
[45] Date of Patent: Mar. 28, 1995

[54] AGGLOMERATION NOZZLE

[75] Inventors: Hanspeter Maier, Moerfelden; Klaus Zimmermann, Kornwestheim, both of Germany

[73] Assignee: Nestec S.A., Vevey, Switzerland

[21] Appl. No.: 102,853

[22] Filed: Aug. 6, 1993

Related U.S. Application Data

[63] Continuation of Ser. No. 678,115, Apr. 1, 1991, abandoned.

[30] Foreign Application Priority Data

May 18, 1990 [EP] European Pat. Off. ............ 90109504

[51] Int. Cl.⁶ ............................................. B05B 7/00
[52] U.S. Cl. ................................. 239/422; 239/424; 426/285
[58] Field of Search ............... 426/285, 453, 456; 264/12, 14; 425/222; 239/418, 422, 423, 424, 427.3, 427.5, 440, 441, 450; 34/12, 174, 221, 225, 233

[56] References Cited

U.S. PATENT DOCUMENTS

| | | | |
|---|---|---|---|
| 3,443,959 | 5/1969 | Ciboit | 426/453 |
| 3,622,081 | 11/1971 | Marsh . | |
| 3,947,166 | 3/1976 | Kleemann et al. . | |
| 4,263,346 | 4/1981 | Sandell | 239/424 |
| 4,420,441 | 12/1983 | Singer | 264/14 |
| 4,618,100 | 10/1986 | White et al. | 239/441 |
| 4,724,620 | 2/1988 | Hsu . | |
| 4,955,546 | 9/1990 | Liaw | 239/441 |

FOREIGN PATENT DOCUMENTS 60-117258 6/1985 Japan .................... 425/222

Primary Examiner—Anthony J. Weier
Attorney, Agent, or Firm—Vogt & O'Donnell

[57] ABSTRACT

An agglomeration nozzle is formed of a cylindrical tube and a sintered plate which surrounds and extends transversely from the tube with respect to a longitudinal axis of the tube at a position adjacent to an end of the tube and which is separated from the tube by a gap.

14 Claims, 5 Drawing Sheets

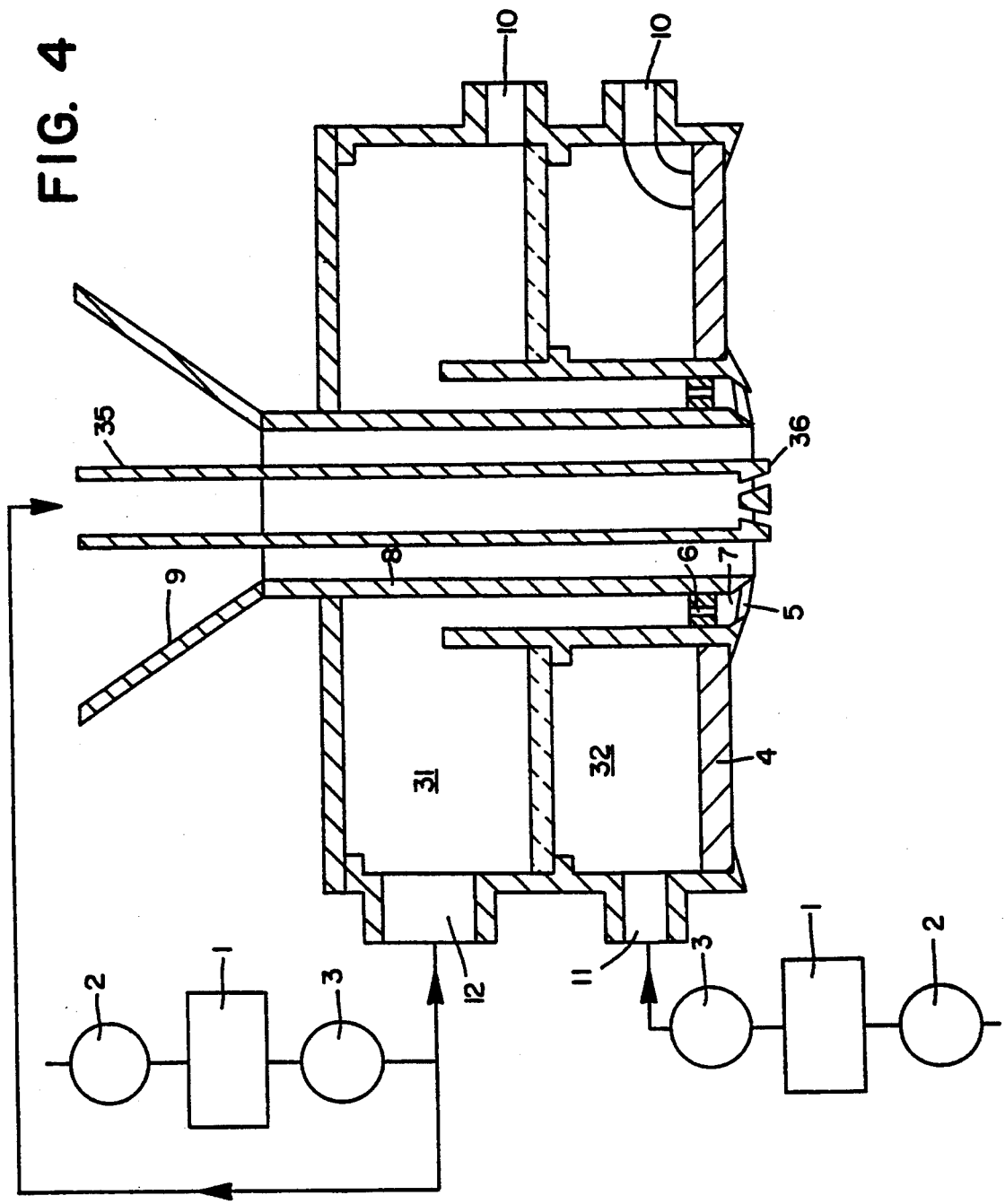

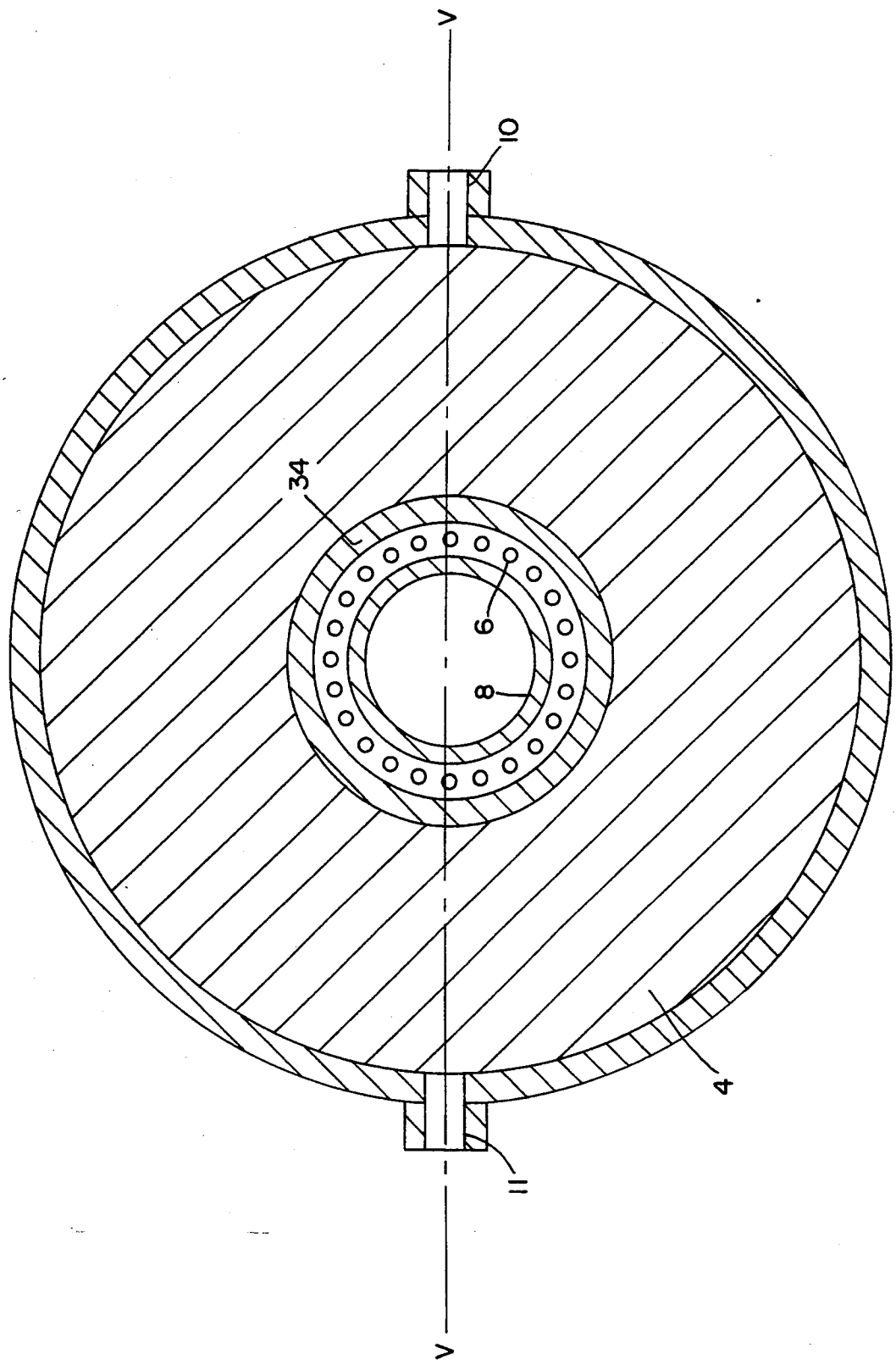

AGGLOMERATION NOZZLE

This is a continuation of U.S. patent application Ser. No. 07/678115, filed Apr. 1, 1991, now abandoned.

BACKGROUND OF THE INVENTION

This invention relates to agglomorating a soluble, powder-form material.

Powder-form products, such as soluble or instant coffee, are usually agglomerated to improve the wettability and solubility of the particles and to increase the average particle diameter. The material to be agglomerated is exposed to the effect of a powerful high-velocity jet of steam. The surfaces of the particles usually have to be thoroughly wetted by the steam to obtain satisfactory agglomeration or a satisfactory surface structure. EP 207 384 describes a process and an apparatus for agglomerating and improving the surface structure of powder-form material. In this known apparatus, however, the wetting zone is not long enough to obtain good agglomeration or darkening, in addition to which the apparatus can clog up after a relatively short period of operation.

SUMMARY OF THE INVENTION

The problem addressed by the present invention was to provide an improved process for treating a soluble, powder-form material, in which the particles are wetted in a long zone, the risk of clogging is minimized and the agglomerate obtained shows improved instant properties and surface properties.

The present invention provides an agglomeration nozzle having a cylindrical tube for feeding a particulate, i.e., powder-form, material, characterized in that it comprises a wetting device positioned coaxially adjacent an end of the tube, an inner wetting device being provided by a circular gap between the tube and an outer wetting device which is formed by an annular sintered metal plate.

In the process according to the invention, the centrally flowing powder-form material is wetted by two gas streams coaxial thereto in a downstream direction, at least the outer gas stream being steam. The inner gas stream is air or steam. The inner gas stream may have a velocity which is equal to or is faster than the outer gas stream, the difference in velocity being dependent on the throughput and type of product: the higher the product throughput, the higher the velocity ratio of the inner gas stream to the outer gas stream. This ratio is between 1:1 and 8:1. The function of the outer gas stream is to ensure that the flow of powder remains uniform for as long as possible. The two streams bring about wetting of the particles and enable the wetting zone to be considerably lengthened so that agglomeration is improved. Another function of the outer stream is to ensure that as little secondary air as possible is drawn into the jet.

According to the invention, the inner stream of steam is thinner than the outer stream. In addition, it is linear or rotates.

DETAILED DESCRIPTION OF THE INVENTION

In the process of the invention steam introduced is superheated or saturated steam at a temperature of 100° to 130° C. and under a pressure of 1 to 1.5 bar. In most cases, the temperature is approximately 100° C. and the pressure of the order of 1 bar. It is also possible to use wet steam which is a mist of fine water droplets in saturated steam. Other water-containing gases may also be used, consisting of mists of microscopic water droplets dispersed in gases other than steam.

The process is suitable for any powder-form materials of which the properties are to be improved in regard to flow, wettability, solubility, hardness and colour, for example powder-form foods. Powder-form foods which may be agglomerated or darkened include soluble coffee, soluble tea, soluble chicory powder, soluble cereal extract powder, milk powder, lactose and mixed beverages based on carbohydrates. Combinations of these materials may also be agglomerated or darkened.

Where the process according to the invention is adopted, the percentage of non-agglomerated powder material is lower than with conventional nozzles.

The apparatus may comprise a one or two portion compartment for the supply and control of the gas stream. With a two-portion compartment arrangement, as disclosed and illustrated further below, the pressure and flow rate of the gas can be separately adjusted.

In the case of a single-compartment arrangement, the feed rate of the steam can be varied through the geometry of the gap opening and the porosity of the sintered metal plate.

The plate comprises a very large number of microscopic pores uniformly distributed over the entire surface of the plate. Depending on the type of sintered metal plate, the pores have an average diameter of 10 to 200 $\mu$m. The steam velocity obtained with this plate is lower than that of the gap. For example, the velocities in the gap and in the sintered metal plate are, respectively, 20 to 30 m/s and 10 m/s and lower. The opening of the gap is narrower than the width of the sintered metal plate.

As mentioned above, it is also possible to provide an additional wetting device to improve wetting of the product stream. This additional wetting device is arranged in the middle of the product stream and also has an opening in the plane mentioned above. The rate of flow through this additional nozzle is 20 to 100 m/s.

To minimize the turbulence of the gas stream, a ring with bores and baffle surfaces has to be arranged over the gap. These bores and baffle surfaces may be linear or inclined.

It is assumed that, under the conditions prevailing in the wetting zone, the particles come into contact with one another at low relative velocities over a relatively long zone, so that the probability of agglomeration is increased.

The agglomeration nozzle according to the invention may be used for several applications, namely, solely for agglomeration, for example for coffee-substitute and cocoa-based beverages, or for combined use of spray drying and agglomeration, for example for coffee extracts, or even for darkening or surface structuring of particles already present in their final size.

Preferred embodiments of the apparatus according to the invention are described in detail in the following with reference to the accompanying drawings.

BRIEF DESCRIPTION OF THE DRAWINGS

FIG. 4 is a diagrammatic partial elevation in cross-section of a second embodiment of the apparatus.

FIG. 5 is a cross-section on the line V—V of FIG. 3.

DETAILED DESCRIPTION OF THE DRAWINGS AND DESCRIPTION OF PREFERRED EMBODIMENTS

Figure 3:
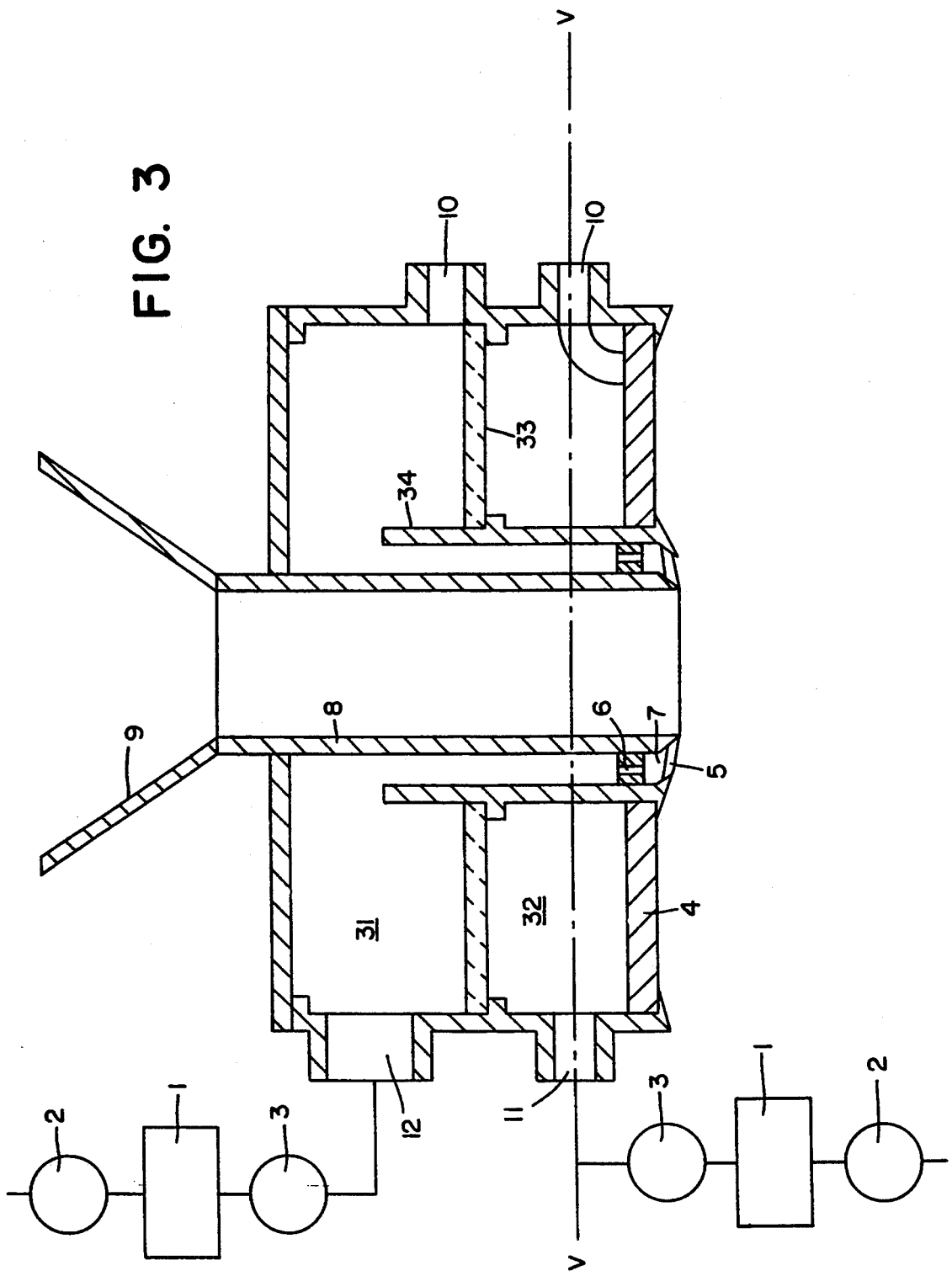
FIG. 3 is a diagrammatic partial elevation in cross-section of the apparatus shown in FIG. 1.

The nozzle 13 illustrated in FIGS. 3, 4 and 5, as may be gathered from the description above, comprises, in its broadest embodiment, a cylindrical tube (8) for feeding a powder-form material therethrough and a sintered plate (4) which surrounds the tube and extends transversely from the feed tube with respect to a longitudinal axis of the feed tube at a position adjacent to an end of the feed tube and which is separated from the feed tube by a gap (5) positioned between an outer wall of the feed tube and an inner edge of the plate. As disclosed above, the plate (4) and gap (5) may be constructed integrally with a one-portion compartment or a two-portion compartment which surrounds the feed tube for assisting supply and control of gas to the plate and gap.

As illustrated in FIGS. 3–5, a second tube (34) is positioned coaxially about feed tube (8) and extends from the gap about the feed tube to form a slot between the two tubes which communicates with gap (5), and as illustrated in FIGS. 3 and 4, edges defining the gap may be beveled to direct the flow, which as shown, provides for a gas flow in a direction towards the longitudinal axis of the feed tube. As also illustrated, a ring with apertured bores may be positioned in the gap (5) (see FIG. 5, in particular).

In the two-portion compartment embodiment, as illustrated, one compartment provides for feeding gas to the gap (5), or slot and gap, and one compartment provides for feeding gas to the sintered plate. As illustrated, the compartment is divided into two portions by a plate 33 positioned transversely with respect to the longitudinal axis of the feed tube, and inlets 11 and 12 and condensate outlets (10) are provided for each compartment portion, the operation of which are discussed further below.

A further embodiment illustrated in FIG. 4, includes a further tube centrally disposed within the feed tube (8) which may be employed for supplying a jet of steam. The outlet may have opening (36) to direct the flow, and as illustrated, the outlet of the additional tube is positioned adjacent the outlet of the feed tube and is beveled to direct the flow away from a longitudinal axis of tube (35).

Figure 1:
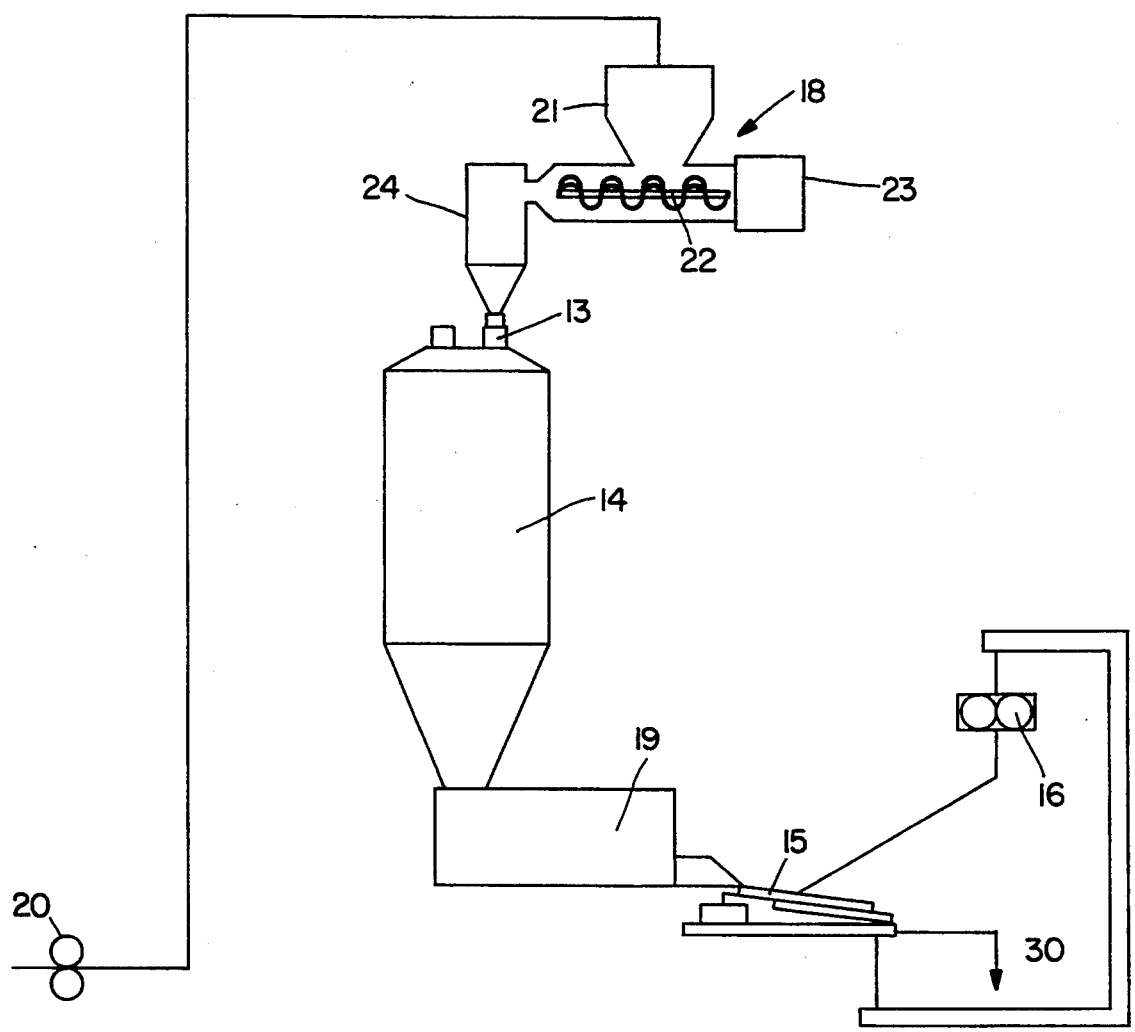
FIG. 1 diagrammatically illustrates an apparatus used for agglomeration.

FIG. 1 illustrates an apparatus suitable for agglomerating a cocoa-containing beverage powder.

A mixture of components is transported to the powder feed (18) by means of a transport system (20). The powder feed (18) consists of a buffer container (21), a metering screw (22), a drive motor (23) and a feed hopper (24). From here, the nozzle (13) is uniformly supplied with powder. In the drying tower (14), the liquid bridges formed between the particles are strengthened by crystallization to such a extent that they no longer disintegrate in the fluidized bed of the dryer (19). The sieve (15) removes oversize particles which are returned via a mill (16) and the end product (30) passes to the filling station.

Figure 2:
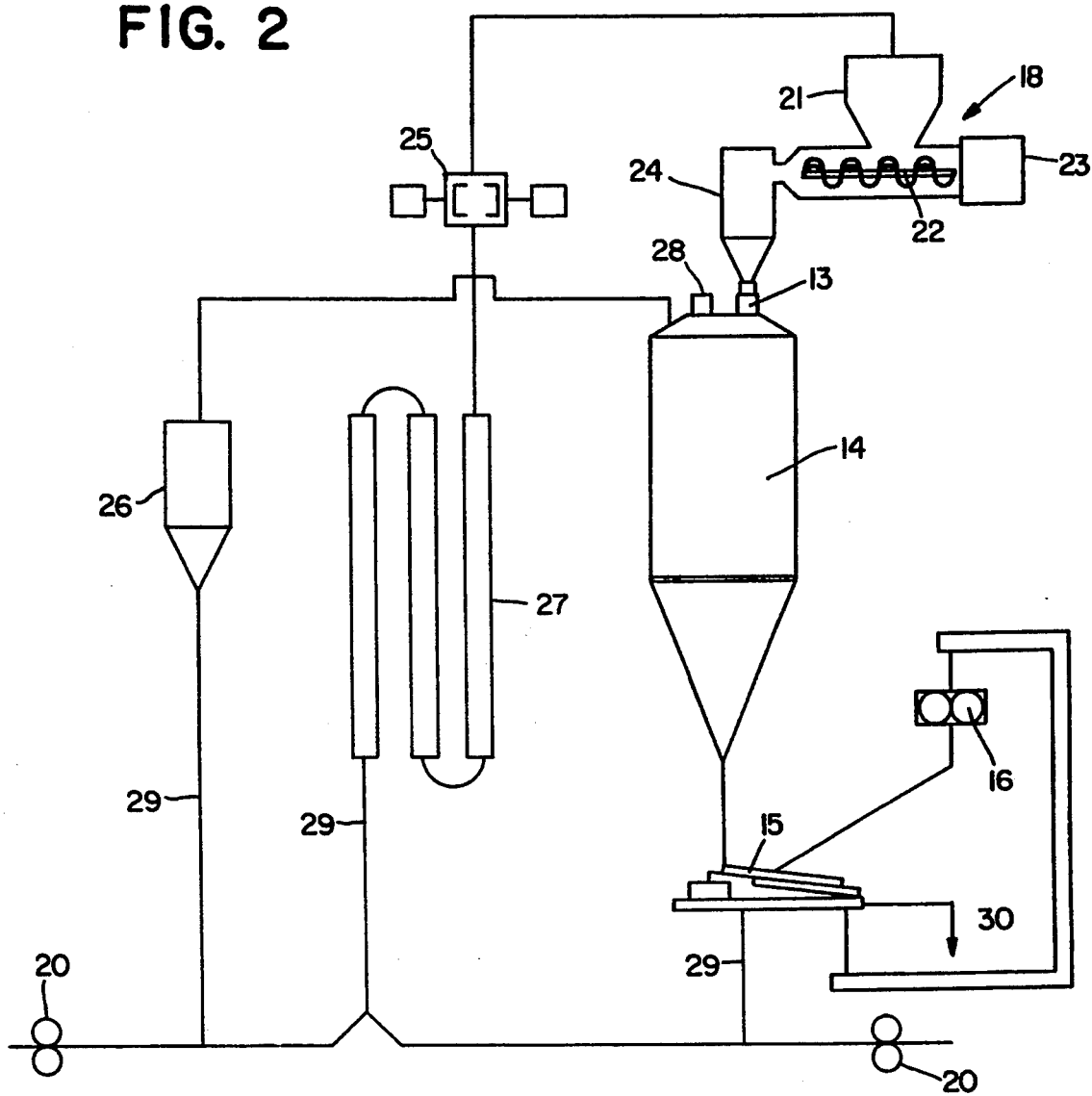
FIG. 2 diagrammatically illustrates an apparatus for spray-drying and agglomeration.

FIG. 2 illustrates an apparatus suitable for agglomerating and spray drying an instant coffee.

The extract (28) sprayed in parallel to the stream of hot air dries in the drying tower (14) before reaching the sieve (15). From the sieve (15) and waste-air dust separator (26), the fine particles (29) are collected via the transport system (20), cooled by the heat exchanger (27) and size-reduced in the mill (25). The product passes through the powder feed (18) to the nozzle (13). The powder feed (18) consists of a buffer container (21), a metering screw (22), a drive motor (23) and a feed hopper (24). After passing through the nozzle (13), the powder wetted with steam enters the integrated drying tower (14) where it dries simultaneously with the extract (28) sprayed in. The sieve (15) removes oversize particles which are returned via a mill (16) and the end product (30) passes to the filling station.

The operation of the nozzle is described below with reference to FIGS. 3–5.

The product passes through the hopper (9) into the powder tube (8). After a mass flow measurement (2), the steam flows through a saturation and superheating unit (1). Temperature and pressure are measured in (3). The split steam compartment (31) is charged in the inlet (12). From there, the steam issues from the gap (5) through a ring with bores (6). Baffle plates (7) determine the direction of flow of the steam. The steam is correspondingly conditioned for the sintered metal plate (4). It passes through the inlet (11) into the sintered metal steam compartment (32) which is separated from the split steam compartment (31) by the intermediate plate (33) and the split tube (34). The steam issues from the sintered metal plate (4) at low velocity and with a very fine mist of droplets. Condensate accumulating in the two compartments (31,32) is removed therefrom through the condensate outlets (10).

FIG. 4 corresponds to the description of FIG. 3 and shows only the additional possibility of applying a central steam jet. It is introduced through a tube (35). The exit velocity is variable through the central nozzle opening (36).

EXAMPLE

For a feed rate of 1 tonne powder per hour, the inner jet comprises 25 kg/h steam at 1.3 bar. The exit velocity is approximately 100 m/s and the temperature 110° C. For the split ring (5), the quantity of steam is 60 kg/h at 1.1 bar, 105° C. and 30 m/s. The coaxial outer stream (sintered metal plate) comprises 100 kg steam/h at 1.15 bar, 102° C. and 7 m/s. The issuing powder jet remains unaffected by inflowing secondary air eddies for at least 1 m.

We claim:

1. An agglomeration nozzle comprising a feed tube and a wetting member configured and positioned for, respectively, separately feeding a flow of a powderform material and a flow of a gas for contacting the powderform material with the gas wherein the feed tube has inner and outer cylindrical surfaces which extend to a feed tube end which surrounds a feed tube outlet and is suitable for feeding a flow of a powderform material through the feed tube and out of the feed tube outlet and wherein the wetting member comprises a sintered plate which extends from a plate edge which extends coaxially about the feed tube outer surface at a position which is adjacent the feed tube outlet end and which is displaced a distance from the feed tube outer surface so that the plate extends transversely from the feed tube with respect to a longitudinal axis of the feed tube for passing a gas through the plate and between the feed tube outer surface and the plate edge.

2. A nozzle according to claim 1 further comprising a first wall portion which extends transversely from the plate at a position displaced away from the plate edge and a second wall portion which extends transversely from the first portion to the feed tube to surround the feed tube to form a compartment for assisting supply and control of a gas to the plate and between the feed tube outer surface and plate edge.

3. A nozzle according to claim 2 wherein the compartment is divided into two portions so that one portion is configured for assisting supply and control of a gas to pass between the feed tube outer surface and the plate edge and so that a second portion is configured for assisting supply and control of a gas to the plate.

4. A nozzle according to claim 1 further comprising a ring positioned between the plate edge and the feed tube outer surface and having a plurality of bore holes positioned therethrough for passing a gas through the ring.

5. A nozzle according to claim 1 or 2 or 3 or 4 further comprising an additional tube having inner and outer circumferential surfaces which extend to an outlet end and which is configured and positioned within the feed tube so that the additional tube outlet end is positioned adjacent the feed tube outlet end and for feeding a powderform material about the additional tube outer surface.

6. A nozzle according to claim 5 wherein the additional tube outlet end is beveled for directing a gas flow in a direction away from the longitudinal axis of the feed tube and further comprising an edge member which is positioned adjacent the plate edge and which is beveled for directing a flow of gas in a direction towards the longitudinal axis of the feed tube.

7. A nozzle according to claim 1 further comprising a second tube which extends from a position integral with the plate edge coaxially about the feed tube outer surface and which has an inner circumferential cylindrical surface displaced a distance from the feed tube outer surface for forming a slot between the feed tube outer surface and second tube inner surface.

8. A nozzle according to claim 3 further comprising a plate positioned in the compartment transversely with respect to the longitudinal axis of the feed tube to divide the compartment into the two portions.

9. A nozzle according to claim 2 further comprising a second tube which extends from a position integral with the plate edge coaxially about the feed tube outer surface and which has an inner circumferential cylindrical surface displaced a distance from the feed tube outer surface for forming a slot between the feed tube outer surface and the second tube inner surface and which extends a distance from the plate to a second tube edge which is displaced a distance from the compartment second wall portion and further comprising a divider plate which is positioned in the compartment and extends transversely with respect to the longitudinal axis of the feed tube and which is connected to the second tube to divide the compartment into portions for separating gas flow between the slot and the plate.

10. A nozzle according to claim 9 further comprising an additional tube having inner and outer circumferential surfaces which extend to an outlet end and which is configured and positioned within the feed tube so that the additional tube outlet end is positioned adjacent the feed tube outlet end and for feeding a powderform material about the additional tube outer surface and further comprising a ring positioned between the plate edge and the feed tube outer surface and having a plurality of bore holes positioned therethrough for passing a gas from the slot through the ring.

11. A nozzle according to claim 9 wherein the second tube extends so that it abuts the plate edge and wherein the outlet ends of the feed tube and second tube are beveled for directing a flow of gas passing between the second tube inner surface and feed tube outer surface.

12. A nozzle according to claim 10 wherein the additional tube outlet end is beveled for directing a gas flow in a direction away from the longitudinal axis of the feed tube and further comprising an edge member which is positioned adjacent the plate edge and which is beveled for directing a flow of gas in a direction towards the longitudinal axis of the feed tube.

13. An agglomeration nozzle according to claim 1 wherein the sintered plate has pores which have an average diameter of from 10 $\mu$m to 200 $\mu$m.

14. A nozzle according to claim 1 wherein the plate is a metal plate.

* * * * *